United States Patent [19]
Dischler

[11] Patent Number: 5,298,201
[45] Date of Patent: Mar. 29, 1994

[54] METHOD FOR IMPROVING DYEABILITY OF FIBER AND ASSOCIATED FABRIC UTILIZING RADIATION

[75] Inventor: Louis Dischler, Spartanburg, S.C.

[73] Assignee: Milliken Research Corporation, Spartanburg, S.C.

[21] Appl. No.: 969,506

[22] Filed: Oct. 30, 1992

Related U.S. Application Data

[63] Continuation of Ser. No. 631,920, Dec. 21, 1990, abandoned.

[51] Int. Cl.$^5$ .............................................. B29C 71/04
[52] U.S. Cl. .................... 264/22; 8/DIG. 12; 264/25
[58] Field of Search ...................... 264/22, 210.5; 8/DIG. 12, 25

[56] References Cited

U.S. PATENT DOCUMENTS

| | | | |
|---|---|---|---|
| 3,506,990 | 4/1970 | Richardson et al. | 8/172 |
| 3,562,220 | 2/1971 | McMillin | 260/78 |
| 3,630,662 | 12/1971 | Brody et al. | 8/172 |
| 3,652,199 | 3/1972 | Leung | 8/30 |
| 3,674,420 | 7/1972 | Sapers | 8/173 |
| 3,713,769 | 1/1973 | Beal et al. | 8/173 |
| 3,771,949 | 11/1973 | Hermes | 8/4 |
| 3,942,950 | 3/1976 | Powers et al. | 8/173 |
| 3,953,167 | 4/1976 | Minemura et al. | 8/175 |
| 4,059,403 | 11/1977 | Wolf et al. | 8/168 B |
| 4,066,395 | 1/1978 | Soiron et al. | 8/169 |
| 4,066,396 | 1/1978 | Wolf et al. | 8/178 A |
| 4,078,889 | 3/1978 | Wolf et al. | 8/168 B |
| 4,108,936 | 8/1978 | Wolf et al. | 264/78 |
| 4,117,033 | 9/1978 | Gale | 524/100 |
| 4,144,023 | 3/1979 | Provost | 8/17 |
| 4,243,580 | 1/1981 | Gale | 524/100 |
| 4,252,534 | 2/1981 | Abel et al. | 8/617 |
| 4,525,168 | 6/1985 | Kelly | 8/130.1 |
| 4,668,234 | 5/1987 | Vance et al. | 8/115.6 |
| 4,755,335 | 7/1988 | Gborashi | 264/48 |
| 4,780,105 | 10/1988 | White et al. | 8/574 |
| 4,814,222 | 3/1989 | Davis et al. | 428/229 |
| 4,883,496 | 11/1989 | Gborashi | 8/476 |
| 4,919,869 | 4/1990 | Zatkulak et al. | 264/78 |
| 5,017,423 | 5/1991 | Bossmann et al. | 264/22 |

Primary Examiner—Catherine Timm
Attorney, Agent, or Firm—Kevin M. Kercher; Terry T. Moyer

[57] ABSTRACT

Fiber, which can be either woven or knitted into the form of fabric, is annealed by ultra-short bursts of radiation that melt the outer crystalline skin of the fiber and is then quenched by the relatively cool inner fiber core.

6 Claims, 4 Drawing Sheets

FIG. -1-
FIG. -2-
FIG. -3-

FIG. −4−
FIG. −5−
FIG. −6−

FIG. -7-
FIG. -8-
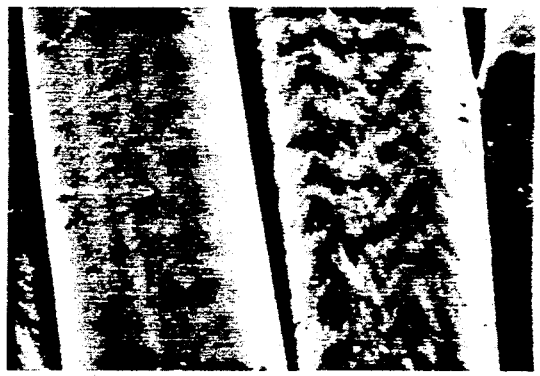
FIG. -9-

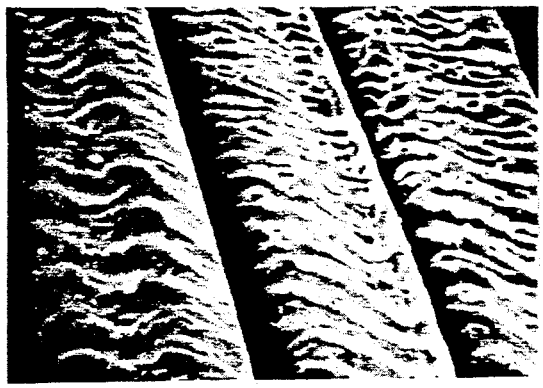
FIG. -10-
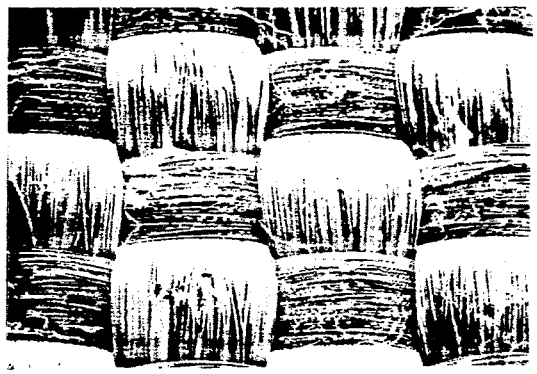
FIG. -11-
FIG. -12-

METHOD FOR IMPROVING DYEABILITY OF FIBER AND ASSOCIATED FABRIC UTILIZING RADIATION

CROSS-REFERENCE TO RELATED APPLICATION:

This application is a continuation of U.S. patent application Ser. No. 07/631,920, filed Dec. 21, 1990 now abandoned.

BACKGROUND OF THE INVENTION

This invention relates to a process for enhancing the dyeability of fiber and associated fabric manufactured therefrom, in particular, fiber having an oriented highly crystalline skin, which is considered to be non-dyeable without carriers or swelling agents. It would be desirable to modify fabric to produce a fabric dyeable without recourse to environmentally problematic chemical agents.

The present invention solves the above problems in a manner not disclosed in the known prior art.

SUMMARY OF THE INVENTION

This invention relates to a process in which a fiber, having a highly oriented crystalline skin, is annealed by relatively short bursts of radiation that melt the outer skin of the fiber, which is then quenched by the relatively cool inner fiber core. The fiber can be combined with other fibers treated in a likewise manner into the form of a woven or knitted fabric. The radiation can come from a variety of sources including a laser, electric arc, flash tube, and so forth.

It is an object of this invention to improve dyeability of fiber without the use of carriers or swelling agents.

It is another object of this invention to clear fabric of debris such as trimer and fibrils.

Yet another object of this invention is to render fibers more resistant to fibrillation.

These and other advantages will be in part obvious and in part pointed out below.

BRIEF DESCRIPTION OF THE DRAWINGS

The above as well as other objects of the invention will become more apparent from the following detailed description of the preferred embodiments of the invention, which when taken together with the accompanying photomicrographs, in which:

FIG. 1 is a photomicrograph of trilobal polyester yarn at 150X magnification before being treated by exposure to radiation of an electric arc;

FIG. 2 is a photomicrograph of trilobal polyester yarn at 500X magnification before being treated by exposure to radiation of an electric arc;

FIG. 3 is a photomicrograph of trilobal polyester yarn at 150X magnification after being treated by exposure to radiation of an electric arc;

FIG. 4 is a photomicrograph of trilobal polyester yarn at 500X magnification after being treated by exposure to radiation of an electric arc;

FIG. 5 is a photomicrograph of polyester knit fabric at 500X magnification before being treated by exposure to radiation of an electric arc;

FIG. 6 is a photomicrograph of polyester knit fabric at 500X magnification after being treated by exposure to radiation of an electric arc;

FIG. 7 is a photomicrograph of polyester woven fabric at 500X magnification before being treated while wet by multiple exposures to radiation from a xenon flash tube;

FIG. 8 is a photomicrograph of polyester woven fabric at 500X magnification after being treated while dry by multiple exposures to radiation from a xenon flash tube;

FIG. 9 is a photomicrograph of NOMEX ® (meta-polyaramid) woven fabric at 2500X magnification before being treated by radiation from an excimer laser;

FIG. 10 is a photomicrograph of NOMEX ® (meta-polyaramid) woven fabric at 2500X magnification after being treated by radiation from an excimer laser;

FIG. 11 is a photomicrograph of KEVLAR ® (para-polyaramid) at 35X magnification before being treated by radiation from an excimer laser; and FIG. 12 is a photomicrograph of KEVLAR ® (para-polyaramid) at 35X magnification after being treated by radiation from an excimer laser.

DETAILED DESCRIPTION OF THE PREFERRED EMBODIMENT

The dyeability of a fiber, having a highly oriented crystalline skin, can be significantly increased by annealing in which the surface temperature of the fiber is briefly raised above its melting temperature and cooled over an equally short period of time. This greatly reduces the resistance to penetration by dyestuffs of the crystalline skin. With the application of a one microsecond or less pulse of radiation that is highly absorbed by the polymer, the surface of the fiber can be made to melt, even in cases where the fibers, such as metapolyaramids, are not considered meltable due to oxidative degradation. This technique greatly increases the dyeability of fibers exhibiting a relatively crystalline skin such as polyester or meta-polyaramid. Since the radiation is highly absorbed, the surface of the fiber receives a larger flux of radiation than the fiber core. This radiation is rapidly converted into heat energy, which also raises fiber surface temperature at an equally rapid rate. It is believed that once the fiber surface melts, absorption of radiation increases, thereby accelerating the thermal differential between fiber surface and core. A critical factor in this process is that the radiative heat transfer rate at the fiber surface must be large in comparison to the thermal diffusivity of the polymer. Furthermore, the duration of the treatment period should be significantly shorter than the thermal relaxation time, which is the time required for the fiber to come to thermal equilibrium after the surface has been heated. In this manner, a very shallow surface layer can be melted without destroying the useful properties of the fiber. In addition, debris attached to the fiber surface are melted into the surface.

There are various sources of radiation that will be useful in this process. These include lasers, electric arcs and flash tubes. The later two have the advantages of lower energy costs and the production of broad band radiation in the ultraviolet region, which is readily absorbed by all polymeric material.

The molten surface of the fiber, due to its oriented condition, is under tension and contracts to form waves. The height and amplitude of the waves are related to the depth of the melted layer. Shallow melting results in relatively shallow waves, deeper melting results in waves large in amplitude and spacing, that may appear to "roll up" from the fiber surface. This effect is shown in FIGS. 3 and 4, which are photomicrographs of a trilobal polyester yarn, which is 1.5 denier per filament, exposed directly to an arc in air produced by a capacitor discharge with an energy of about one Joule. FIGS. 3 and 4 are at 150X and 500X magnification respectively. FIGS. 1 and 2 are photomicrographs of untreated trilobal polyester at 150X and 500X magnification respectively.

FIG. 6 is a photomicrograph of a polyester woven fabric, which is 2.2 denier per filament, treated by a similar capacitor discharge. FIG. 5 is a photomicrograph of the polyester woven fabric before treatment.

FIGS. 7 and 8 are photomicrographs of a woven polyester fabric, which is 2.2 denier per filament, treated with ten exposures of approximately twelve Joules each from a xenon flash tube with a bore of three millimeters and an arc length of fifty millimeters. The pulse time is estimated to be between 500 nanoseconds to one microsecond. In FIG. 7, where the fabric has been treated while wet, little or no melting is observed, presumably because of radiative absorption by the water film. In FIG. 8, multiple treatments cause unmelted regions of the fiber to melt and merge with the waves created by the first treatment. In this way, the amplitude of the waves is increased while the spacing remains constant. The fiber may be thus notched to a large fraction of its diameter. It can be seen from this microphotograph that the original wave peaks have become unstable and alternate peaks have begun to merge.

Very small waves can be detected on the surface of a NOMEX ® fabric, which is a trademark owned by E. I. duPont de Nemours and Co. and is described in U.S. Pat. No. 4,198,494. A NOMEX ® fabric of 1.6 denier per filament is shown in the photomicrograph of FIG. 10. These waves were created by 200 millijoule pulsed UV radiation from a Krypton Fluoride excimer laser. This fiber is readily dyeable by disperse or basic dyes without the need for carriers or swelling agents. FIG. 9 is a photomicrograph that shows the untreated NOMEX ®.

Similar waves are created in KEVLAR ®, which is also a trademark owned by E. I. duPont de Nemours and Co. as well as described in U.S. Pat. No. 4,198,494 by the application of excimer radiation. However, only a small improvement in dyeability is obtained due to the highly oriented structure that is believed to persist throughout the fiber and not just at the outer surface or skin. FIG. 12 is a photomicrograph of treated fabric at 1 denier per filament and reveals the complete removal of fibrils when compared to the untreated fabric as shown in the photomicrograph of FIG. 11.

It is not intended that the scope of the invention be limited to the specific embodiment illustrated and described. Rather, it is intended that the scope of the invention be defined by the appended claims and their equivalents.

What is claimed is:

1. A method for improving the dyeability of a polyaramid fiber having a highly oriented, crystalline skin and an inner fiber core which comprises annealing said highly oriented, crystalline skin by the application of short bursts of radiation from a flash tube followed by quenching said highly oriented, crystalline skin by said inner fiber core having a relatively cooler temperature than said highly oriented, crystalline skin.

2. A method as recited in claim 1, wherein said step of applying radiation comprises a plurality of radiation pulses wherein the radiation is from flash tube.

3. A method for improving the dyeability of a plurality of polyaramid fibers each highly oriented, crystalline skins and inner fiber cores that are formed into a textile fabric which comprises annealing said highly oriented, crystalline skins by the application of short bursts of radiation from a flash tube followed by quenching said highly oriented, crystalline skins by said inner fiber cores having a relatively cooler temperature than said highly oriented, crystalline skins.

4. A method for improving the dyeability of a polyaramid fiber having a highly oriented, crystalline skin and an inner fiber core which comprises annealing said highly oriented, crystalline skin by the application of short bursts of radiation from an electric arc following by quenching said highly oriented, crystalline skin by said inner fiber core having a relatively cooler temperature than said highly oriented, crystalline skin.

5. A method as recited in claim 4, wherein said step of applying radiation comprises a plurality of radiation pulses wherein the radiation is from electric arc.

6. A method for improving the dyeability of a plurality of polyaramid fibers each having highly oriented, crystalline skins and inner fiber cores that are formed into a textile fabric which comprises annealing said highly oriented, crystalline skins by the application of short bursts of radiation from an electric arc followed by quenching said highly oriented, crystalline skins by said inner fiber cores having a relatively cooler temperature than said highly oriented, crystalline skins.

* * * * *

UNITED STATES PATENT AND TRADEMARK OFFICE
CERTIFICATE OF CORRECTION

PATENT NO. : 5,298,201
DATED : March 29, 1994
INVENTOR(S) : Louis Dischler

It is certified that error appears in the above-identified patent and that said Letters Patent is hereby corrected as shown below:

Column 4, line 21  insert "having" between the words "each highly"

Signed and Sealed this

Eighteenth Day of February, 1997

Attest:

BRUCE LEHMAN

*Attesting Officer*  *Commissioner of Patents and Trademarks*